United States Patent
Clark (10) Patent No.: US 12,347,348 B2
(45) Date of Patent: Jul. 1, 2025

(54) STRUCTURED DISPLAY SHUTDOWN FOR VIDEO PASS-THROUGH ELECTRONIC DEVICES

(71) Applicant: Apple Inc., Cupertino, CA (US)

(72) Inventor: Brian C. Clark, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 18/028,205

(22) PCT Filed: Sep. 24, 2021

(86) PCT No.: PCT/US2021/051895
§ 371 (c)(1),
(2) Date: Mar. 23, 2023

(87) PCT Pub. No.: WO2022/067001
PCT Pub. Date: Mar. 31, 2022

(65) Prior Publication Data
US 2023/0410699 A1    Dec. 21, 2023

Related U.S. Application Data

(60) Provisional application No. 63/083,806, filed on Sep. 25, 2020.

(51) Int. Cl.
*G09G 3/00* (2006.01)
*G06F 3/01* (2006.01)
*G06T 11/40* (2006.01)

(52) U.S. Cl.
CPC ............. *G09G 3/001* (2013.01); *G06F 3/013* (2013.01); *G06T 11/40* (2013.01); *G09G 2330/021* (2013.01); *G09G 2354/00* (2013.01)

(58) Field of Classification Search
CPC ........ G06F 3/013; G06T 11/40; G06T 19/006
See application file for complete search history.

(56) References Cited

U.S. PATENT DOCUMENTS

| 8,392,695 B1 | 3/2013 | Lachwani |
| 9,741,169 B1 | 8/2017 | Hotz |

(Continued)

FOREIGN PATENT DOCUMENTS

| WO | WO 2022/067001 | 3/2022 |
| WO | WO 2023/049287 | 3/2023 |

OTHER PUBLICATIONS

Extended European Search Report from European Patent Application No. 23197934.5, dated Feb. 22, 2024, 10 pages.

(Continued)

*Primary Examiner* — Charles Tseng
(74) *Attorney, Agent, or Firm* — BAKERHOSTETLER (57) ABSTRACT

The subject technology provides structured-shutdown-mode versions of a video view of a physical setting of an electronic device. An electronic device may provide, at a first power consumption rate, a video view of a portion of the physical setting, the portion being physically blocked from being directly viewed by a user of the device, by the electronic device itself. Structured-shutdown-mode versions of a video view may be provided, at a second power consumption rate lower than the first power consumption rate, to a display of an electronic device when the device determines that it is in a low power or failure state. In this way, the electronic device can reduce the functionality and power consumption of the display in a structured manner, to continue to provide a version of the video view to the user in the low power or failure mode state.

20 Claims, 5 Drawing Sheets

(56) References Cited

U.S. PATENT DOCUMENTS

| | | | |
|---|---|---|---|
| 10,203,762 | B2 | 2/2019 | Bradski et al. |
| 11,676,329 | B1 | 6/2023 | Ma et al. |
| 11,720,171 | B2 | 8/2023 | Pastrana Vicente et al. |
| 2012/0249416 | A1* | 10/2012 | Maciocci ............. H04N 9/3173 |
| | | | 345/156 |
| 2019/0064522 | A1 | 2/2019 | Reif |
| 2019/0158795 | A1* | 5/2019 | Chun ..................... H04N 23/15 |
| 2019/0387168 | A1 | 12/2019 | Smith et al. |
| 2020/0098097 | A1 | 3/2020 | Rodriguez et al. |
| 2020/0336719 | A1 | 10/2020 | Morisawa |
| 2022/0292790 | A1 | 9/2022 | Lohr et al. |
| 2023/0144091 | A1 | 5/2023 | Forutanpour et al. |
| 2023/0161613 | A1 | 5/2023 | Rajendran |

OTHER PUBLICATIONS

International Search Report and Written Opinion from PCT/US2021/051895, dated Feb. 14, 2022, 25 pages.

Office Action from U.S. Appl. No. 18/462,161, dated Dec. 27, 2024, 20 pages.

Final Office Action from U.S. Appl. No. 18/462,161, dated Apr. 18, 2025, 22 pages.

* cited by examiner

STRUCTURED DISPLAY SHUTDOWN FOR VIDEO PASS-THROUGH ELECTRONIC DEVICES

CROSS REFERENCE TO RELATED APPLICATIONS

This application claims the benefit of priority to U.S. Provisional Patent Application No. 63/083,806, filed on Sep. 25, 2020, the disclosure of which is hereby incorporated herein in its entirety.

TECHNICAL FIELD

The present description relates generally to extended reality settings.

BACKGROUND

Augmented reality technology aims to bridge a gap between virtual environments and a physical environment by providing an enhanced physical environment that is augmented with computer-generated content that is not part of the physical environment. As a result, the computer-generated content that is not part of the physical environment appears to be part of the physical environment as perceived by a user. Augmented reality is sometimes provided by a device that provides a pass-through video view of the physical environment to a user, and adds the computer-generated content to the pass-through video view.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A person can interact with and/or sense a physical environment or physical world without the aid of an electronic device. A physical environment can include physical features, such as a physical object or surface. An example of a physical environment is a physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

In XR systems that have an opaque display or a transparent or translucent display that is controlled to become opaque (e.g., including XR systems that implement a video pass-through electronic device), the user may not have a direct view of some or all of their physical setting when the system/device is in use. In a VR system, the entirety of the user's view is a virtual setting. In a pass-through AR system, the user is reliant on the cameras of the system to provide a video view of the setting. Aspects of the subject technology can help maintain a view of the physical setting in scenarios in which the system has low battery, or in the event of a failure of some portion of the system that provides information for processing the video feed (e.g., eye tracking sensors and/or depth sensors) and/or that the video feed processes (e.g., a video graphics processor) from the cameras to provide the video view.

Implementations of the subject technology described herein provide various features for ensuring that the user of an XR electronic device and/or a video pass-through electronic device receives a view of the setting in the case of low battery or system or sub-system failure. As described in further detail hereinafter, one or more structured-shutdown-mode versions of the video view can be provided in the event of a low power or failure state of the device.

Figure 1A:
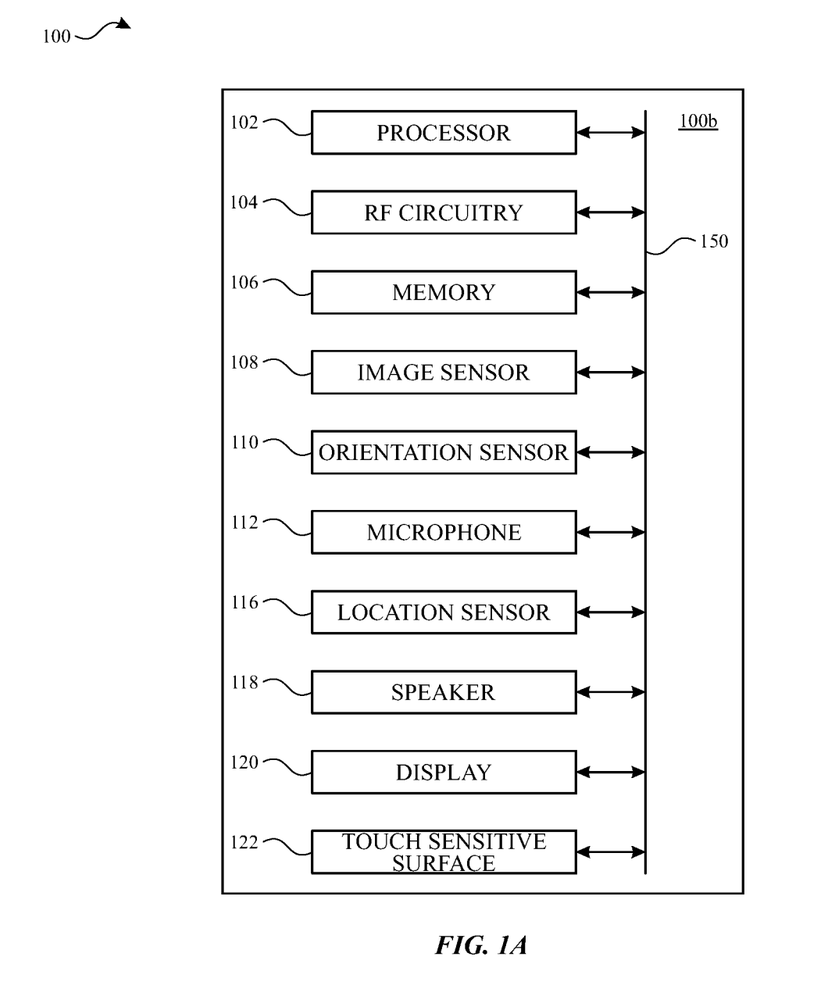
FIGS. 1A-1B depict exemplary systems for use in various extended reality technologies, including virtual reality and mixed reality in accordance with one or more implementations.
Figure 1B:
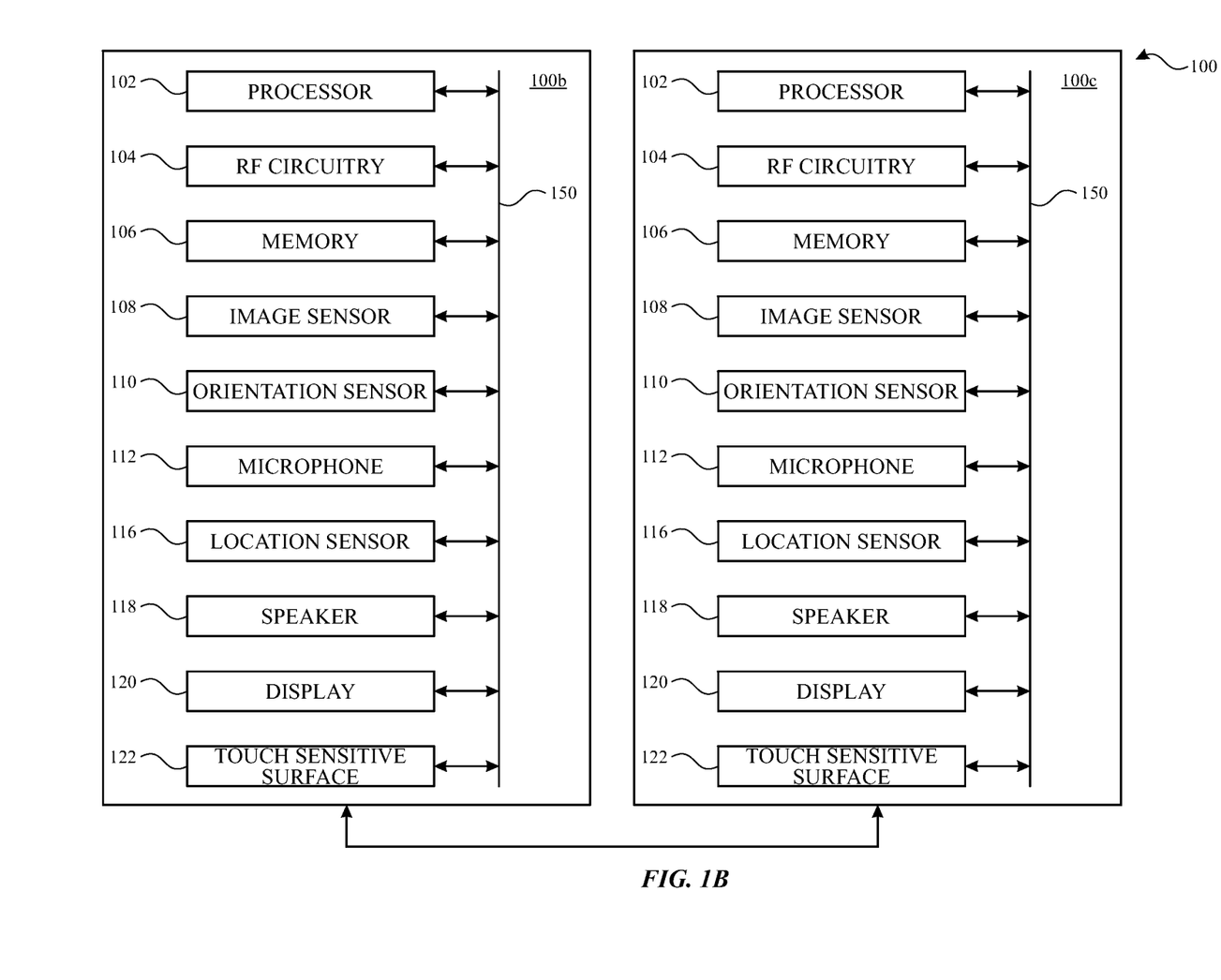

FIG. 1A and FIG. 1B depict exemplary system 100 for use in various extended reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of system 100 are implemented in a second device (e.g., a head-mounted device). In some examples, device 100a is implemented in a base station device or a second device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Figure 2:
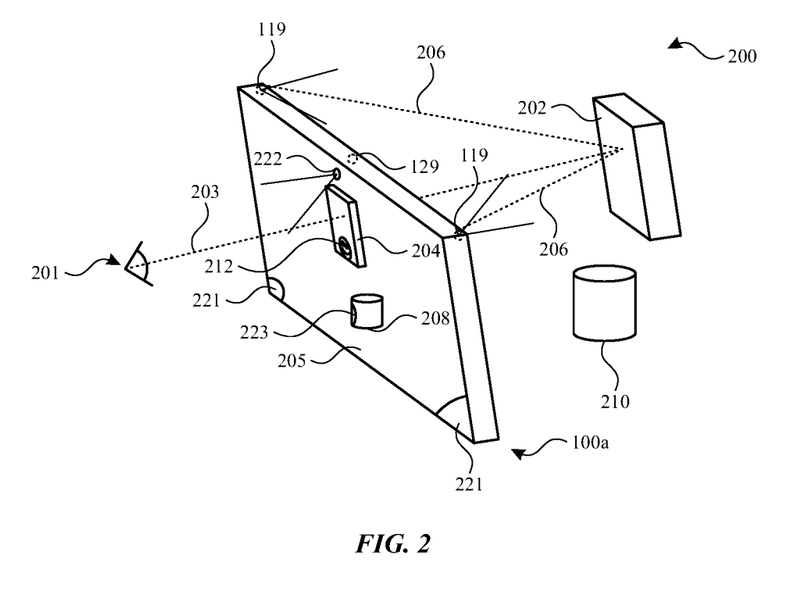
FIG. 2 illustrates an example of a physical setting of an electronic device that is displaying a video view of a portion of the physical setting in accordance with one or more implementations.

FIG. 2 illustrates an example physical setting of an electronic device implemented as a video pass-through electronic device. In the example of FIG. 2, a physical setting 200 of an electronic device such as electronic device 100a includes a physical object 202 and a physical object 210. As shown, an eye 201 of a user can have a line of sight 203 that, in the absence of the electronic device 100a, would land on the physical object 202. In this example, the physical object 210 would also be visible to the user even though the user's gaze is directed toward the physical object 202.

As shown, the electronic device 100a (e.g., including display 205 of the electronic device such as an implementation of display 120 of FIGS. 1A and 1B) blocks a direct view of physical objects 202 and 210 by the user. In order to provide the user with a view of the physical objects 202 and 210 (and/or other portions of the physical setting) that are blocked by the presence of the electronic device 100a and the display 205, a video view (e.g., a video pass-through view) of the physical setting 200 may be displayed by the display 205. For example, one or more cameras of the electronic device 100a may capture images of the physical setting that can be displayed by the display 205.

In the example of FIG. 2, a video view of at least the portion of the physical setting 200 that is blocked from the user's direct view by electronic device 100a is displayed to the user by display 205, including a video version 204 of physical object 202, and a video version 208 of physical object 210. As shown, electronic device 100a may also generate and display virtual content 212 that can be overlaid or otherwise added to and/or merged with the video view of the physical setting, to generate an extended reality setting for the user of the electronic device.

In the example of FIG. 2, the video version 204 of physical object 202 and the video version 208 of physical object 210 are displayed by display 205 to appear to the user to be at the actual physical locations (e.g., at the correct angular location and depth) of the physical objects 202 and 210, as they would be viewed by the user directly (e.g., in the absence of electronic device 100a). For example, electronic device 100a may obtain a depth map of a portion of the physical setting 200 using a depth sensor 129 (e.g., implementing one or more of image sensor(s) 108, orientation sensor(s) 110, and/or location sensor(s) 116 of FIGS. 1A and 1B), and may include one or more additional cameras and/or sensors such as eye sensor 222 that track the gaze location of each of the user's eyes and/or the location at which the gaze directions of the user's eye converge (e.g., at a gaze plane). The depth map of the physical setting 200, and the current eye data for the user's eye(s) 201, can be used to perform a pixel level transformation (warping or reprojection) of the image frames from camera(s) 119 to generate display frames from the correct viewpoint and position of the user's eyes at any given time, and with each pixel reprojected at the correct depth according to the depth map.

For example, to provide the most realistic experience for a user, the view of the physical setting 200 that is displayed by display 205 would include all of the rays of light from the physical setting that would enter the user's eye in the absence of electronic device 100a (e.g., if the display 205 and/or other portions of the electronic device 100a were not blocking the user's direct view of the physical setting). However, as illustrated in FIG. 2, one or more of the cameras 119 that collect the light from the physical setting 200 may be offset from the location and/or gaze direction of the user's eye(s) 201. That is, the line of sight 203 from the user's eye 201 to a physical object 202 at any given time (e.g., based on the gaze direction of each eye at that time) can be different from the line(s) of sight 206 of the camera(s).

Thus, the camera view of the physical setting can be warped (e.g. transformed, such as based on the current eye data from eye sensor 222 and the depth map generated using sensors 129, using a reprojection of each pixel) by the electronic device 100a to display the physical setting and the physical objects therein, to the user, from the user's perspective.

The fields of view of any one of camera(s) 119 may be also limited or different in comparison with the field of view of a human user. For example, portions of the physical setting in the user's peripheral vision may not be within the field of view of a color camera of the electronic device. As another example, the warping of the image data to transform the image data to the user's perspective (e.g., to a current line of sight 203 as determined by eye sensor 222) can cause portions of an object (e.g., a portion along an edge of an object) that would be visible to the user, to be displayed incorrectly as those portions are not visible from the perspective of the camera(s). In order to provide a more complete field of view of the physical setting to the user and/or correct for perspective differences with display 205, images (e.g., the camera feed or video feed) from multiple cameras can be combined to form each display frame that is displayed to the user by display 205.

In one or more implementations, the cameras 119 of electronic device 100a may include, for example, one or more primary cameras and one or more secondary cameras. The secondary camera(s) may consume less power than the primary camera(s). For example, the primary camera(s) may include one or more color cameras, and the secondary camera(s) may include one or more monochrome (e.g., black and white) cameras. The primary camera(s) may have a resolution that is higher than the resolution of the secondary camera(s). In one or more implementations, color images obtained by the primary camera(s) may be used (e.g., warped, processed, and/or rendered) to generate the video pass-through view of the physical setting that is displayed to the user, while (e.g., monochrome) images from the secondary camera(s) can be used for other tasks such as object detection and tracking. In one or more implementations, portions of the (e.g., monochrome) images that include portions of the physical setting 200 that are not included in the primary camera (e.g., color) images (e.g., due to a different physical location and/or field of view of the secondary camera(s) relative to the primary camera(s)) can also be used to fill the missing portions of the primary camera field(s) of view. For example, FIG. 2 illustrates portions 221 (e.g., portions at or near the edge(s) of the user's field of view) and a portion 223 (e.g., a portion along an edge of a displayed version 208 of a physical object 210) of a display frame that have been filled using monochrome camera images.

In order to provide a visually seamless video view of the physical setting to the user, the portions of monochrome images that are used to fill the missing portions of color camera field(s) of view can be colorized. Colorizing the portions of the monochrome images that are used to fill the missing portions of the color camera field(s) of view can include determining (e.g., by providing color information from the color images to a machine learning model at the electronic device) a color for each of the pixels of the portions of the monochrome images that are used to fill the missing portions of the color camera field(s) of view, based on the color of pixels in the color images. The displayed portions 221 and 223 can be displayed using the determined color(s).

Obtaining the eye tracking data and the depth map, processing the image data from cameras 119 to warp, fill, and/or colorize the image data, and/or generating and adding virtual content to the processed image data to generate each display frame can be processor and/or power intensive operations (e.g., that combine to consume power at a first power consumption rate during normal operations of the display). Performing these processor and/or power intensive operations relies on availability of power (e.g., from a power source such as one or more batteries at the electronic device) and/or various processing resources (e.g., general processing resources and/or dedicated processing resources such as sensors 129 and eye sensor 222, and video processing components and/or processes, rendering components and/or processes, virtual content generating components and/or processes) of the device. For example, an electronic device such as electronic device 100*a* may include first processing circuitry (e.g., an image signal processor (ISP) for streaming camera data from camera(s) 119 to display 205) and second processing circuitry (e.g., an additional video processing chip or processing core) that receives the camera data and the sensor data and generates the warped, filled, and/or colorized video view for display to a user.

In some circumstances, the processing resources can fail (e.g., due to mechanical, electrical, or software issues) and/or power can become limited and/or unavailable (e.g., due to a system fault and/or a low battery) causing the system to deactivate or limit some processing resources. During use of general electronic devices that display content that is unrelated to the physical setting, a low power state (e.g., a state in which power is limited, unavailable, and/or insufficient for processing and display of camera data and/or virtual content) or a failure state (e.g., a state in which one or more of the general processing resources and/or dedicated processing resources such as video processing components and/or processes, rendering components and/or processes, virtual content generating components and/or processes used for generating the display frames for display becomes corrupted or unavailable) may result in loss of function of the display, which may be inconvenient or undesirable to the user.

In an electronic device such as an electronic device 100*a* in which the cameras and display of the electronic device are used, by the user, to view and/or navigate some or all of their own physical setting (e.g., via a video view of the physical setting as illustrated in FIG. 2), a low power state or a failure state that results in loss of function of the display can be particularly undesirable. This can be particularly true when the portion of the setting being viewed by the user on the display of the electronic device is blocked by the display and/or the electronic device itself (e.g., by the user holding the device in front of their eyes or wearing a head mounted system that partially or completely blocks their view of some or all of their physical setting).

Electronic devices disclosed herein, such as electronic device 100*a*, implement various structured display shutdown measures to help maintain at least a version of a video view of the physical setting for user (e.g., at a second power consumption rate lower than the first power consumption rate), even in cases of a low power state or failure state for the electronic device.

For example, in the configuration shown in FIG. 2, an electronic device (e.g., electronic device 100*a*, also referred to herein as a device) is provided with a display 205 that is configured to display virtual content 212 to a user that is located in a physical setting 200. As shown, the device also includes one or more cameras 119 configured to obtain a video feed of at least a portion of the physical setting 200. The device may process the video feed to generate a video view of the portion of the physical setting (e.g., a portion of the physical setting including one or more physical objects such as physical objects 202 and 210 at various positions and/or depths), and provide the video view corresponding to the processed video feed to the display for display with the virtual content.

As described above in connection with FIG. 2, the device may process the video feed to generate the video view (e.g., in a normal mode of operation of the device) by warping the video feed to conform the video feed from a view of the camera(s) 119 to a view of the user, and combining the virtual content 212 with the warped video feed for display. In one or more implementations, the device may obtain current eye data (e.g., a line of sight 203 corresponding to a gaze direction for one or both eyes of the user, and/or a gaze plane corresponding to a convergence location for the gaze directions of the users eyes) for the user from at least one eye sensor such as eye sensor 222 (e.g., an eye tracking sensor that includes a light source and/or a camera for each eye of the user), and warp the video feed to the view of the user based on the current eye data. Warping the video feed based on the current eye data may include performing a per-pixel warping or reprojection of the video feed based on the current eye data and a depth map of the physical setting.

As described above in connection with FIG. 2, the device may also process the video feed to generate the video view (e.g., an a normal mode of operation of the device) by obtaining a monochrome video feed from the at least one monochrome camera (e.g., a monochrome or black and white camera, such as a single color visible light or infrared camera), performing a color estimation for a portion of the monochrome video feed based on the video feed from the color camera, and filling a portion (e.g., corresponding to the portions 221 and 223 of the displayed video frames) of the video feed using the monochrome video feed and the color estimation.

Figure 3:
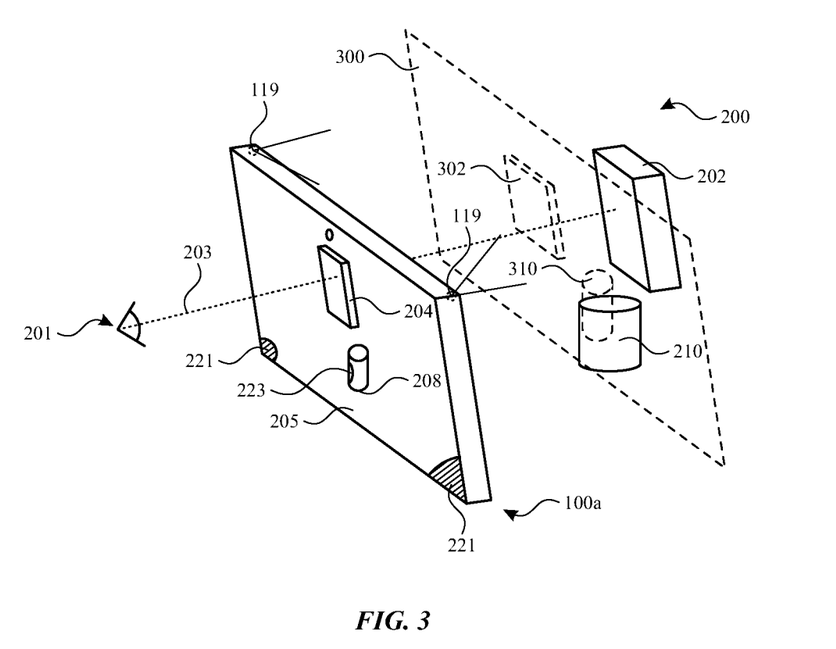
FIG. 3 illustrates an example of a structured-shutdown-mode version of the video view of FIG. 2 in accordance with one or more implementations.
Figure 4:
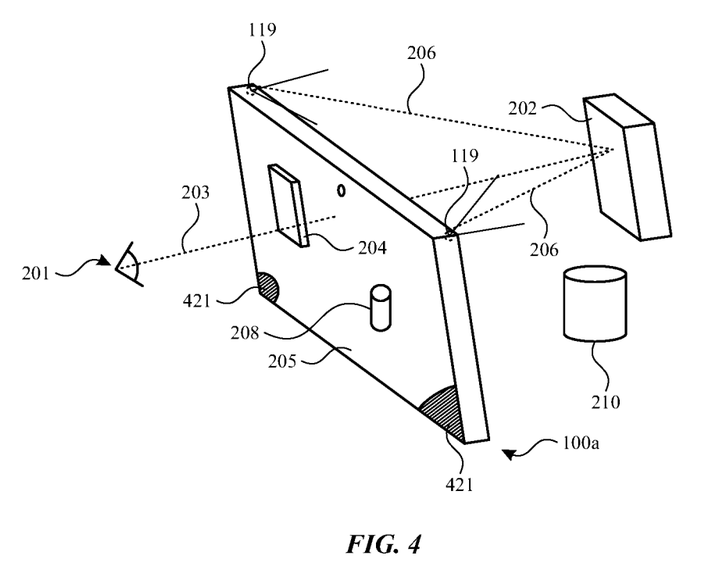
FIG. 4 illustrates another example of a structured-shutdown-mode version of the video view of FIG. 2 in accordance with one or more implementations.

In one or more implementations, the device may identify display modification state (e.g., a reduced functionality state of the device, such as a low power state or a failure state for the device). Responsive to identifying the display modification, the device may modify the processing of the video feed to provide (e.g., at the second power consumption rate lower than the first power consumption rate) a structured-shutdown-mode version of the video view of the portion of the physical setting to the display 205 while the device is in the display modification state. The structured-shutdown-mode version of the video view may be generated using reduced power and/or processing resources relative to generating the video view. FIGS. 3 and 4 illustrate examples of structured-shutdown-mode versions of a video view that can be generated while the device is in the display modification state (e.g., the low power state or the failure state). A device may provide one possible structured-shutdown-mode version of the video view (e.g., one of the examples described herein) or can provide multiple possible structured-shutdown-mode versions of the video view (e.g., each being available for use depending on a severity of the low power state or the failure state).

FIG. 3 illustrates an example of a structured-shutdown-mode version of the video view of FIG. 2. The structured-shutdown-mode version of the video view may be generated, for example, in a display modification state (e.g., low power state or a failure state) in which the eye sensor(s) 222, depth sensor(s), and/or video graphics processor are unavailable. In the example of FIG. 3, electronic device 100a has modified the processing of the video feed to generate the structured-shutdown-mode version of the video view by discontinuing the warping of the video feed based on the current eye data, obtaining nominal eye data for the user, and performing a transformation of the video feed to a predefined surface (e.g., an optical surface such as surface 300) based on the nominal eye data. The transformation of the video feed to the predefined surface may be a homography transformation.

The nominal eye data may include an interpupillary distance, and an assumption of a neutral gaze position for the user's eyes (e.g., a gaze position of the user's eyes under the assumption that the user is looking straight forward at the horizon). The interpupillary distance (IPD) may be obtained from device memory, such as from a last known IPD measurement from eye sensor 222, or from a hardware component (e.g., a linear encoder) of a head mounted system that physically positions display modules of the device.

In one example, during normal operations, an IPD measurement may be (e.g., periodically or continuously) determined based on eye tracking data from the eye sensor 222, and stored in memory (e.g., at the display or in memory for an ISP) for later use in a low power or failure state of the electronic device that trigger a display modification state. In another example, the IPD may be determined based on a mechanical and/or electronic setting of the physical distance between display modules for each of the user's eyes (e.g., by the user or by the device), the physical distance obtainable from the linear encoder for use as an interpupillary distance for the user. The distance of the surface 300 at which structured-shutdown-mode version of the video view is projected in FIG. 3 can be determined based the IPD and an assumed eye position at neutral gaze (e.g., when the measurement of the actual gaze direction of the user's eyes is discontinued to save power and/or processing in the low power or failure mode, or is not available due to the failure mode).

In the example of FIG. 3, surface 300 is depicted as a planar optical surface. In other implementations, other optical surfaces can be used for the homography transformation, such as a spherical optical surface onto which the video pixels can be projected.

In one or more implementations, the transformation of the video feed illustrated in FIG. 3 can be a pixel-independent homography transformation. For example, each pixel of a video frame can be projected onto the same predetermined surface 300 regardless of the depth of the physical object represented in that pixel, in contrast with the warping shown in FIG. 2, for which each pixel of a video frame is reprojected for the user based on the current gaze location of the user's eyes and the depth of the physical object in that pixel, to project the content of that pixel at correct optical depth.

As illustrated in FIG. 3, when the video versions 204 and 208 of physical objects 202 and 210 are projected onto a common surface 300, instead of appearing to the user to be at the correct corresponding depth in the physical setting and to have a three-dimensional shape (e.g., as in FIG. 2), the video versions 204 and 208 may appear to be flat objects 302 and 310 at a common optical depth. The transformation and projection onto the predetermined surface 300 as shown in FIG. 3, is thus a lower quality projection than the warping described in connection with FIG. 2.

However, because the determination of the IPD is only performed once (e.g., in comparison with the current eye tracking used for the warping), and because the transformation to the predetermined surface is a pixel-independent computation, projecting the video view onto the predetermined surface 300 as shown in FIG. 3 can be performed using reduced power and/or processing resources. Accordingly, modifying the video processing to the homography transformation of FIG. 3 can provide one implementation of a structured-shutdown-mode version of a video feed that can be provided when the device is in the display modification state (e.g., the low power state or the failure state).

FIG. 3 also illustrates other modifications that can be performed (e.g., together with and/or instead of the transformation and projection onto the predetermined surface 300) to generate a structured-shutdown-mode version of a video view when the device is in the display modification state. For example, as shown in FIG. 3, generating and displaying the virtual content 212 may be discontinued in a structured-shutdown-mode version of a video view. In one or more structured-shutdown-mode versions of the video view, the transformation and projection onto the predetermined surface 300 can be performed without combining the virtual content with the transformed video feed as shown in FIG. 3. In one or more structured-shutdown-mode versions of the video view, the device may modify the processing of the video feed to generate the structured-shutdown-mode version of the video view by continuing to perform the warping of the video feed based on the current eye data (e.g., as in FIG. 2) without combining the virtual content with the warped video feed.

FIG. 3 also illustrates how the device may modify the processing of the video feed to generate the structured-shutdown-mode version of the video view by discontinuing the filling of the portions 221 and/or 223 using data from other sensors and/or cameras such as a monochrome camera, and/or the discontinuing the color estimation for the filled pixels. In the example of FIG. 3, the color estimation is discontinued and greyscale filling is provided in portions 221 and 223. In one or more implementations, the filling itself may also be discontinued.

In one or more implementations, the display modification state may be a low power state that triggers a switch to a structured-shutdown-mode version of a video view of a device and that may be identified based on the power level of the device itself (e.g., a battery charge level) and/or can be determined based on additional information. For example, the device may determine a position of the user (e.g., a seated position or a standing position) using one or more sensors of the device. The device may identify the low power state for the device based at least in part based on the position of the user as detected by the device. For example, a power threshold for identifying the low power state, and thus triggering generation of a power saving structured-shutdown-mode version of a video view, may be higher when the user is standing than when the user is sitting. In this way, the device can continue operating in the normal mode of operation longer if the user is in a seated or otherwise stationary position.

FIG. 4 illustrates another modification that can be performed to generate a structured-shutdown-mode version of a video view when the device is in the display modification state (e.g., low power state or the failure state). In the example of FIG. 4, the device has discontinued all transformation of the video feed from camera(s) 119, and displays the video feed unmodified from the camera(s). As shown in FIG. 4, displaying the video feed unmodified may cause the video versions 204 and 208 of physical objects 202 and 210 to appear at displaced locations relative to their actual physical locations (e.g., due to the different line(s) of sight 206 of the camera(s) 119 relative to the line of sight 203 of the user's eye). The structured-shutdown-mode version of the video view of FIG. 4 may be a distorted view that includes missing portions 421 of the view (e.g., corresponding to areas outside the fields of view of the camera(s)) and may thus be provided as a last resort structured-shutdown-mode version of the video view prior to total shutdown of the device and/or the display.

In various operational scenarios, any or all of the structured-shutdown-mode versions of the video view described above in connection with FIGS. 2, 3, and 4 may be used to reduce the functionality and/or power consumption rate of the display in a structured manner while continuing to provide a view of the user's physical setting to the user in any of various low power modes and/or failure modes of the device. In scenarios in which the user does not take action to address the display modification state of the device, the device may detect an imminent failure of the structured-shutdown-mode version of the video view (e.g., due to further failures of processing systems and/or components, and/or due to a power level that has fallen below a minimum level for operating the camera(s) and/or display). The device may provide an alert (e.g., an audio alert, a tactile alert, a visual alert, and/or any other output of the device to alert the user) to the user to move the display to unblock the direct view due to the imminent failure (e.g., to remove a head mounted system form the user's head before the display and/or the device power fails completely).

Figure 5:
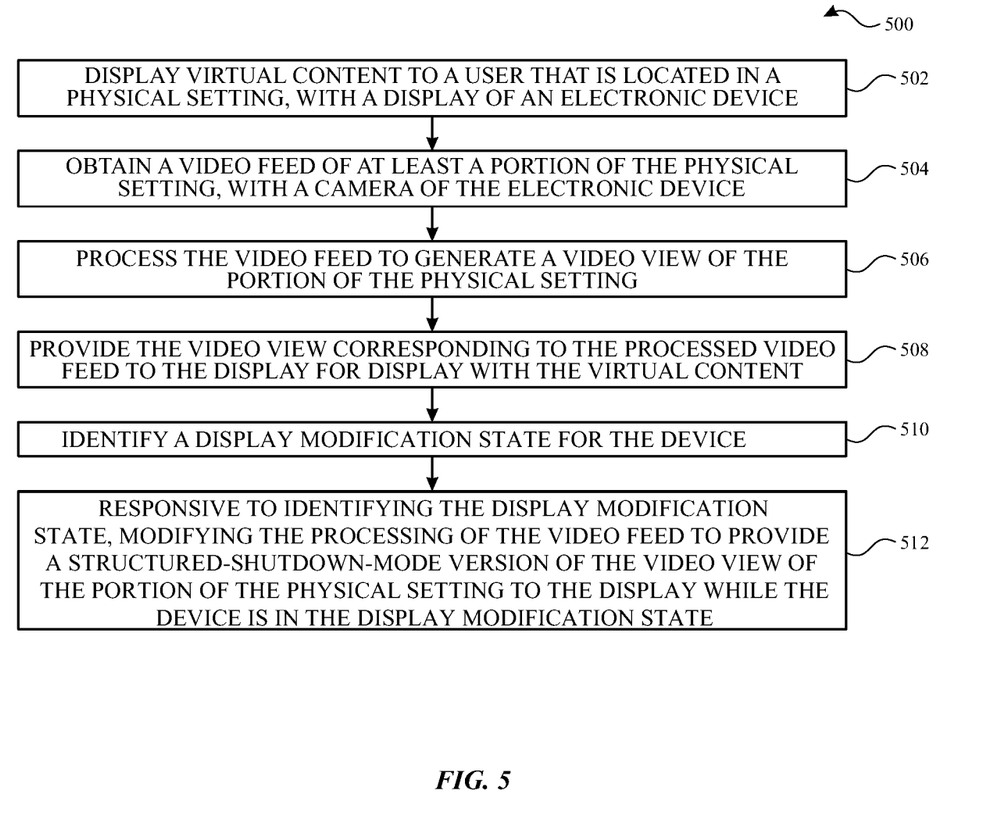
FIG. 5 illustrates a flow chart of an example process for providing structure display shutdown for video pass-through electronic devices in accordance with implementations of the subject technology.

FIG. 5 illustrates a flow diagram of an example process 500 for providing a structured-shutdown-mode video view of a physical setting of an electronic device in accordance with implementations of the subject technology. For explanatory purposes, the process 500 is primarily described herein with reference to the electronic device 100a of FIGS. 1A and 1B. However, the process 500 is not limited to the electronic device 100a of FIGS. 1A and 1B, and one or more blocks (or operations) of the process 500 may be performed by one or more other components of other suitable devices, including the electronic device 100b and/or the electronic device 100c. Further for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As illustrated in FIG. 5, at block 502, virtual content (e.g., virtual content 212) is displayed to a user that is located in a physical setting, with a display (e.g., display 205) of an electronic device such as electronic device 100a. The virtual content may be generated by the electronic device for display as part of an extended reality setting that includes a video view of some or all of a physical setting.

At block 504, a video feed of at least a portion of the physical setting is obtained with a camera of the electronic device. The camera may be a color camera or a monochrome camera. The electronic device may include one or more cameras such as camera(s) 119 described herein and/or one or more sensors such as sensors 129 and/or eye sensor 222 described herein.

At block 506, the video feed may be processed to generate a video view of the portion of the physical setting (e.g., at a first power consumption rate). In one or more implementations, processing the video feed to generate the video view may include obtaining current eye data for the user from the at least one eye sensor, warping the video feed to conform the video feed from a view of the camera to a view of the user based on the current eye data, and combining the virtual content with the warped video feed for display (e.g., as described above in connection with FIG. 2).

In one or more implementations, the camera may be a color camera, and processing the video feed to generate the video view may include obtaining a monochrome video feed from at least one monochrome camera of the electronic device, performing a color estimation for a portion of the monochrome video feed based on the video feed from the color camera, and filling a portion of the video feed using the monochrome video feed and the color estimation (e.g., as described above in connection with FIG. 2). Various device operations for obtaining current eye data for the user from the at least one eye sensor, warping the video feed to conform the video feed from a view of the camera to a view of the user based on the current eye data, combining the virtual content with the warped video feed for display, obtaining a monochrome video feed from at least one monochrome camera of the electronic device, performing a color estimation for a portion of the monochrome video feed based on the video feed from the color camera, and/or filling a portion of the video feed using the monochrome video feed and the color estimation, can each consume device power that, in combination, results in power consumption at the first power consumption rate.

At block 508, the video view corresponding to the processed video feed may be provided to the display for display with the virtual content (e.g., as described above in connection with FIG. 2).

At block 510, a display modification state (e.g., a low power state or a failure state) may be identified for the device. Identifying the display modification state may include identifying a low power state which may include determining that a charge level of a battery of the device is below a threshold (e.g., a fixed threshold or a threshold determined based on user position and/or movement). Identifying the display modification state may include identifying a failure state which may include identifying a failure of a sensor, a camera, or a processing resource such as a video graphics processor.

At block 512, responsive to identifying the display modification state, the processing of the video feed may be modified to provide (e.g. at a second power consumption rate lower than the first power consumption rate) a structured-shutdown-mode version of the video view of the portion of the physical setting to the display while the device is in the display modification state. In one or more implementations, when the structured-shutdown-mode view is provided (e.g., in the display modification state), a notification may be displayed or otherwise provided to the user indicating that the device is in an adjusted operation state, such as the display modification state. Modifying the processing of the video feed to provide the structured-shutdown-mode version of the video view of the portion of the physical setting to the display may include any or all of discontinuing a warping of the video feed, discontinuing generating and displaying virtual content, discontinuing filling and/or color estimation operations, and/or providing the video feed to the display unmodified, as described above in connection with, for example, FIGS. 2, 3, and 4. It is appreciated that discontinuing a warping of the video feed, discontinuing generating and displaying virtual content, discontinuing filling and/or color estimation operations, and/or providing the video feed to the display unmodified can reduce the power consumption of the device, and result in providing a version of the video feed for display at a second power consumption rate lower than the first power consumption rate.

In various implementations, modifying the processing of the video feed may include providing the video feed as captured by the camera to the display unmodified or discontinuing a warping operation, a filling operation, and/or a color estimation operation of the processing. In one or more implementations, modifying the processing of the video feed to provide the structured-shutdown-mode version of the video view of the portion of the physical setting to the display may include discontinuing the warping of the video feed based on the current eye data; obtaining nominal eye data for the user; and performing a transformation of the video feed to a predefined surface based on the nominal eye data. In one or more implementations, warping the video feed based on the current eye data may include performing a per-pixel warping based on the current eye data. Transforming of the video feed may include a pixel-independent transformation, such as a transformation to a predetermined surface. In one or more implementations, modifying the processing of the video feed to generate the structured-shutdown-mode version of the video view includes discontinuing at least one of the color estimation or the filling.

Various processes defined herein consider the option of obtaining and utilizing a user's personal information. For example, such personal information may be utilized in order to provide a video view of a physical setting. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

Figure 6:
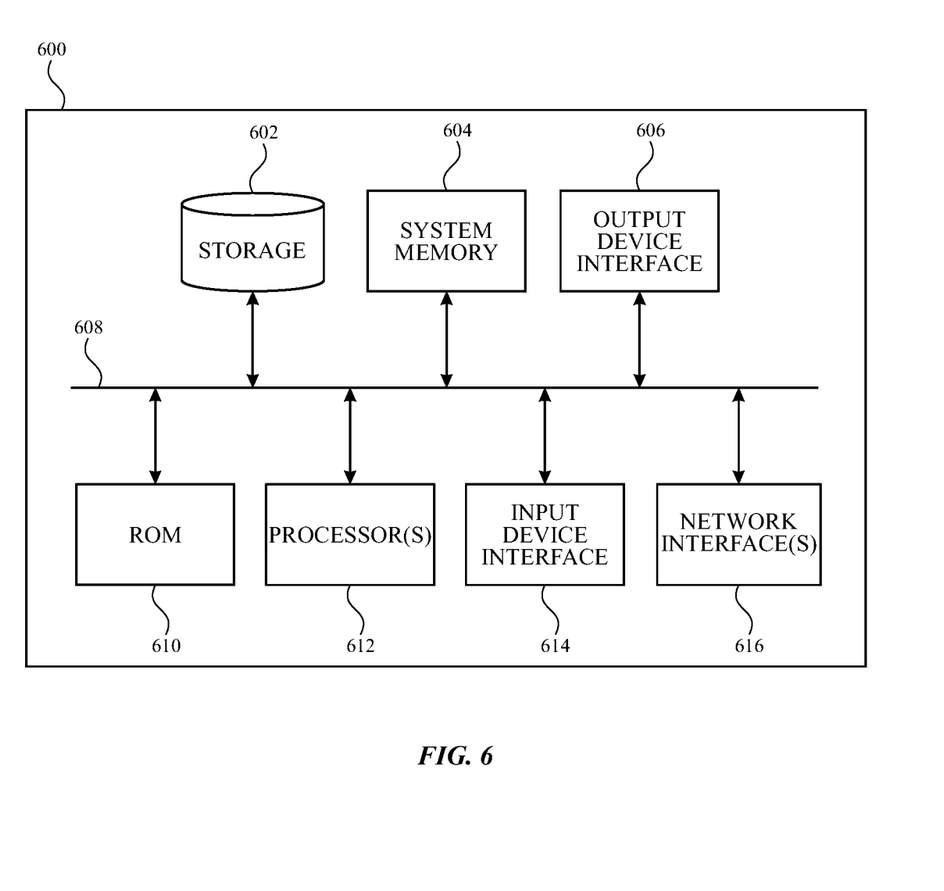
FIG. 6 illustrates an exemplary computing system in accordance with one or more implementations.

FIG. 6 illustrates an exemplary computing system in accordance with one or more implementations. As shown in FIG. 6, a computing system 600 may include storage 602, system memory 604, an output device interface 606, read-only memory (ROM), processor(s) 610, an input device interface 614, network interface(s) 616, and a bus 608.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In accordance with aspects of the disclosure, a method is provided that includes obtaining a video feed of at least a portion of a physical setting, with a camera of an electronic device; processing the video feed to generate a video view of the portion of the physical setting at a first power consumption rate; providing the video view corresponding to the processed video feed for display; identifying a display modification state for the device; and responsive to identifying the display modification state, modifying the processing of the video feed to provide, at a second power consumption rate lower than the first power consumption rate, a structured-shutdown-mode version of the video view of the portion of the physical setting for display while the device is in the display modification state.

In accordance with aspects of the disclosure, a device is provided that includes a display; a camera configured to obtain a video feed of at least a portion of a physical setting; and one or more processors configured to: process the video feed to generate a video view of the portion of the physical setting at a first power consumption rate; provide the video view corresponding to the processed video feed to the display for display; identify a display modification state for the device; and responsive to identifying the display modification state, modify the processing of the video feed to provide, at a second power consumption rate lower than the first power consumption rate, a structured-shutdown-mode version of the video view of the portion of the physical setting to the display while the device is in the display modification state.

In accordance with aspects of the disclosure, a non-transitory computer-readable medium is provided, the non-transitory computer-readable medium storing instructions that, when executed by one or more processors of a device, cause the one or more processors to: obtain a video feed of at least a portion of a physical setting, with a camera of an electronic device; process the video feed to generate a video view of the portion of the physical setting at a first power consumption rate; provide the video view corresponding to the processed video feed for display; identify a display modification state for the device; and responsive to identifying the display modification state, modify the processing of the video feed to provide, at a second power consumption rate lower than the first power consumption rate, a structured-shutdown-mode version of the video view of the portion of the physical setting for display while the device is in the display modification state.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A device, comprising:
   a display; and
   one or more processors configured to:
      obtain an input video feed of at least a portion of a physical setting;
      process the input video feed to generate a processed video feed by:
         warping the input video feed from a view of a camera to a view of a user to generate a warped video feed, and
         combining virtual content with the warped video feed for display;
      generate a video view of the portion of the physical setting at a first power consumption rate using the processed video feed;
      provide the video view corresponding to the processed video feed to the display for display;
      identify a display modification state for the device; and
      responsive to identifying the display modification state, modify the processing of the input video feed, by omitting the virtual content from the warped video feed, to provide, at a second power consumption rate lower than the first power consumption rate, a structured-shutdown-mode version of the video view of the portion of the physical setting to the display while the device is in the display modification state.

2. The device of claim 1, wherein the display modification state comprises a low power state or a failure state.

3. The device of claim 2, further comprising at least one eye sensor, wherein the one or more processors are further configured to:
   obtain current eye data for the user from the at least one eye sensor; and
   warp the input video feed to the view of the user based on the current eye data.

4. The device of claim 3, wherein the one or more processors are further configured to modify the processing of the input video feed to generate the structured-shutdown-mode version of the video view by:
   discontinuing the warping of the input video feed based on the current eye data;
   obtaining nominal eye data for the user; and
   performing a transformation of the input video feed to a predefined surface based on the nominal eye data.

5. The device of claim 4, wherein the current eye data comprises a gaze direction for each eye of the user, and wherein the nominal eye data comprises an interpupillary distance and a neutral gaze.

6. The device of claim 4, wherein the one or more processors are configured to warp the input video feed based on the current eye data by performing a per-pixel warping based on the current eye data and a depth map, and wherein the transformation of the input video feed comprises a pixel-independent transformation.

7. The device of claim 3, wherein the one or more processors are configured to omit the virtual content from the warped video feed by continuing to perform the warping of the input video feed based on the current eye data without combining the virtual content with the warped video feed.

8. The device of claim 1, further comprising a color camera configured to generate the input video feed and at least one monochrome camera, and wherein the one or more processors are configured to process the input video feed to generate the video view by:
   obtaining a monochrome video feed from the at least one monochrome camera;
   performing a color estimation for a portion of the monochrome video feed based on the input video feed from the color camera; and
   filling a portion of the input video feed using the monochrome video feed and the color estimation.

9. The device of claim 8, wherein the one or more processors are configured to modify the processing of the input video feed to generate the structured-shutdown-mode version of the video view by discontinuing at least one of the color estimation or the filling.

10. The device of claim 1, wherein the one or more processors is configured to identify the display modification state at least in part by identifying a low power state for the device based at least in part based on a position of the user as detected by the device.

11. A device, comprising:
    a display; and
    one or more processors configured to:
       obtain an input video feed of at least a portion of a physical setting;
       process the input video feed to generate a video view of the portion of the physical setting at a first power consumption rate;
       provide the video view corresponding to the processed input video feed to the display for display;
       identify a display modification state for the device; and
       responsive to identifying the display modification state, modify the processing of the input video feed to provide, at a second power consumption rate lower than the first power consumption rate, a structured-shutdown-mode version of the video view of the portion of the physical setting to the display while the device is in the display modification state, wherein the display is configured to block a direct view of at least a portion of the physical setting from a user when the device is worn by the user, and wherein the one or more processors are further configured to:
detect an imminent failure of the structured-shutdown-mode version of the video view; and
provide an alert to the user to move the display to unblock the direct view due to the imminent failure.

12. The device of claim 11, wherein the one or more processors are configured to modify the processing of the input video feed by discontinuing at least one of a warping operation, a filling operation, or a color estimation operation of the processing.

13. A method, comprising:
obtaining an input video feed of at least a portion of a physical setting, with an electronic device;
processing the input video feed to generate a processed video feed at least in part by:
obtaining current eye data for a user from at least one eye sensor, and
warping the input video feed from a view of a camera to a view of the user based on the current eye data;
generating a video view of the portion of the physical setting at a first power consumption rate using the processed video feed;
providing the video view corresponding to the processed video feed for display;
identifying a display modification state for the electronic device; and
responsive to identifying the display modification state, modifying the processing of the input video feed by discontinuing the warping of the input video feed from the view of the camera to the view of the user based on the current eye data to provide, at a second power consumption rate lower than the first power consumption rate, a structured-shutdown-mode version of the video view of the portion of the physical setting for display while the electronic device is in the display modification state.

14. The method of claim 13, wherein modifying the processing of the input video feed to generate the structured-shutdown-mode version of the video view further includes:
obtaining nominal eye data for the user; and
performing a transformation of the input video feed to a predefined surface based on the nominal eye data.

15. The method of claim 14, wherein warping the input video feed based on the current eye data comprises performing a per-pixel warping based on the current eye data and a depth map, and wherein the transformation of the input video feed comprises a pixel-independent transformation.

16. The method of claim 13, wherein obtaining the input video feed comprises obtaining the input video feed from a color camera of the electronic device, and wherein processing the input video feed to generate the processed video feed includes:
obtaining a monochrome video feed from at least one monochrome camera of the electronic device;
performing a color estimation for a portion of the monochrome video feed based on the input video feed from the color camera; and
filling a missing field of view portion of the input video feed using the monochrome video feed and the color estimation.

17. The method of claim 16, wherein modifying the processing of the input video feed to generate the structured-shutdown-mode version of the video view includes discontinuing at least one of the color estimation or the filling.

18. A non-transitory computer-readable medium storing instructions that, when executed by one or more processors of an electronic device, cause the one or more processors to:
obtain an input video feed of at least a portion of a physical setting, with a color camera of the electronic device;
process the input video feed to generate a processed video feed at least in part by:
obtaining a monochrome video feed from at least one monochrome camera;
performing a color estimation for a portion of the monochrome video feed based on the input video feed from the color camera; and
filling a portion of the input video feed using the monochrome video feed and the color estimation;
generate a video view of the portion of the physical setting at a first power consumption rate using the processed video feed;
provide the video view corresponding to the processed video feed for display;
identify a display modification state for the electronic device; and
responsive to identifying the display modification state, modify the processing of the input video feed by discontinuing at least one of the color estimation or the filling to provide, at a second power consumption rate lower than the first power consumption rate, a structured-shutdown-mode version of the video view of the portion of the physical setting for display while the electronic device is in the display modification state.

19. The non-transitory computer-readable medium of claim 18, wherein the instructions, when executed by the one or more processors of the electronic device, cause the one or more processors to further modify the processing of the input video feed by providing the input video feed as captured by a camera of the electronic device to the display unmodified.

20. The non-transitory computer-readable medium of claim 18, wherein the instructions, when executed by the one or more processors of the electronic device, cause the one or more processors to further modify the processing of the input video feed by discontinuing a warping operation.

* * * * *

UNITED STATES PATENT AND TRADEMARK OFFICE
CERTIFICATE OF CORRECTION

PATENT NO. : 12,347,348 B2  
APPLICATION NO. : 18/028205  
DATED : July 1, 2025  
INVENTOR(S) : Brian C. Clark Page 1 of 1

It is certified that error appears in the above-identified patent and that said Letters Patent is hereby corrected as shown below:

In the Claims

Column 18; Line Nos. 62-63 (Claim 11): Replace "processed input video feed" with --processed video feed--.

Signed and Sealed this  
Sixteenth Day of September, 2025

Coke Morgan Stewart  
*Acting Director of the United States Patent and Trademark Office*